United States Patent
Karzig et al.

(10) Patent No.: US 12,099,898 B2
(45) Date of Patent: Sep. 24, 2024

(54) CALIBRATING MAJORANA QUBITS BY PROBING TOPOLOGICAL DEGENERACY

(71) Applicant: Microsoft Technology Licensing, LLC, Redmond, WA (US)

(72) Inventors: Torsten Karzig, Goleta, CA (US); Roman Mykolayovych Lutchyn, Santa Barbara, CA (US); Jukka Ilmari Vayrynen, West Lafayette, IN (US); Roman Bela Bauer, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 923 days.

(21) Appl. No.: 16/942,555

(22) Filed: Jul. 29, 2020

(65) Prior Publication Data

US 2022/0036227 A1     Feb. 3, 2022

(51) Int. Cl.
    *G06N 10/00*          (2022.01)

(52) U.S. Cl.
    CPC .................... *G06N 10/00* (2019.01)

(58) Field of Classification Search
    CPC ........ G06N 10/00; G06N 10/20; G06N 10/40; G06N 10/60; G06N 10/70; G06N 10/80
    See application file for complete search history.

(56) References Cited

U.S. PATENT DOCUMENTS

2018/0053809 A1*   2/2018   Freedman ............... G06N 10/40
2019/0324846 A1*   10/2019   Ioffe .................... G06F 11/1008
2020/0356887 A1*   11/2020   Moodera ................ H10N 69/00

FOREIGN PATENT DOCUMENTS

WO     2018035360 A1     2/2018

OTHER PUBLICATIONS

Van Zanten, David MT, et al. "Photon-assisted tunnelling of zero modes in a Majorana wire." Nature Physics 16.6 (2020): 663-668. (Year: 2020).*
Van Zanten, David MT, et al. "Photon Assisted Tunneling of Zero Modes in a Majorana Wire." arXiv preprint arXiv:1902.00797 (2019). (Year: 2019).*
Deng, M. T., et al. "Majorana bound states in a coupled quantum-dot hybrid-nanowire system." arXiv preprint arXiv:1612.07989 (2016). (Year: 2016).*

(Continued)

*Primary Examiner* — Markus A. Vasquez
(74) *Attorney, Agent, or Firm* — Alleman Hall & Tuttle LLP

(57) ABSTRACT

A method for use with a topological quantum computing device is provided. The method may include setting a plurality of device parameters for a qubit architecture including a plurality of Majorana zero modes (MZMs). The method may further include calibrating the plurality of device parameters at least in part by determining whether the plurality of MZMs exhibit ground state degeneracy. When the plurality of MZMs are determined to not exhibit ground state degeneracy, calibrating the plurality of device parameters may further include modifying one or more device parameters of the plurality of device parameters. When the plurality of MZMs are determined to exhibit ground state degeneracy, the method may further include modifying one or more parameters of a measurement device coupled to the qubit architecture.

16 Claims, 9 Drawing Sheets

(56) References Cited

OTHER PUBLICATIONS

Albrecht, et al., "Exponential protection of zero modes in Majorana islands", In Journal of Nature, vol. 531, Mar. 10, 2016, 18 Pages.
Bauer, et al., "Dynamics of Majorana-based qubits operated with an array of tunable gates", In Repository of arXiv:1803.05451v1, Mar. 14, 2018, 11 Pages.
Lutchyn, et al., "Realizing Majorana zero modes in superconductor-semiconductor heterostructures", In Repository of arXiv:1707.04899v1, Jul. 16, 2017, pp. 1-18.
"International Search Report and Written Opinion Issued in PCT Application No. PCT/US21/032224", Mailed Date: Apr. 7, 2022, 14 Pages.
Van Zanten, et al., "Photon-assisted tunnelling of zero modes in a Majorana wire", In Journal of Nature Physics, vol. 16, Issue 6, Jun. 2020, pp. 663-668.
Beri, et al., "Topological Kondo Effect with Majorana Fermions", In Repository of arXiv:1206.2224v1, Jun. 11, 2012, pp. 1-6.
Danon, et al., "Nonlocal Conductance Spectroscopy of Andreev Bound States: Symmetry Relations and BCS Charges", In Repository of arXiv:1905.05438, May 14, 2019, 07 Pages.
Karzig, et al., "Scalable Designs for Quasiparticle-Poisoning-Protected Topological Quantum Computation with Majorana Zero Modes", In Repository of arXiv:1610.05289, Jun. 21, 2017, 34 Pages.
Lutchyn, et al., "Majorana Fermions and a Topological Phase Transition in Semiconductor-Superconductor Heterostructures", In Repository of arXiv:1002.4033, Aug. 13, 2010, 05 Pages.
Menard, et al., "Conductance-Matrix Symmetries of a Three-Terminal Hybrid Device", In Repository of arXiv:1905.05505, May 14, 2019, 08 Pages.
Razmadze, et al., "Radio-Frequency Methods for Majorana-Based Quantum Devices: Fast Charge Sensing and Phase-Diagram Mapping", In Journal of Physical Review Applied, vol. 11, Issue 6, Jun. 5, 2019, 09 Pages.
Rosdahl, et al., "Andreev Rectifier: A Nonlocal Conductance Signature of Topological Phase Transitions", In Journal of Physical Review B, vol. 97, Issue 4, Jan. 22, 2018, 12 Pages.
"AFS4-00100800-14-10P-4", Retrieved from: https://www.everythingrf.com/products/microwave-rf-amplifiers/miteq/567-74-afs4-00100800-14-10p-4, Retrieved Date: May 19, 2020, 05 Pages.
Colless, J. et al., "Dispersive Readout of a Few-Electron Double Quantum Dot with Fast rf Gate-Sensors," Physical Review Letters, vol. 110, No. 4, Epublished on arXiv Oct. 17, 2012, 5 pages.
Iftikhar, Z. et al., "Tunable Quantum Criticality and Super-ballistic Transport in a 'Charge' Kondo Circuit," arXiv:1708.02542v2, Jul. 3, 2018, 19 pages.

* cited by examiner

CALIBRATING MAJORANA QUBITS BY PROBING TOPOLOGICAL DEGENERACY

BACKGROUND

Topological qubits are one type of qubit that has been the focus of recent quantum computing research. Each topological qubit may include Majorana zero modes (MZMs) that may, for example, be formed at junctions between a semiconductor and a superconductor. A measurement device may be coupled to each MZM included in the qubit. When the topological quantum computing device is used, gates may be applied to topological qubits by performing a series of measurements on the topological qubits. These measurements may each be a joint parity operator measurement for two or more of the MZMs included in the qubit. Thus, a quantum computation may be performed by applying a series of joint parity measurements to the MZMs included in the topological qubit.

SUMMARY

According to one aspect of the present disclosure, a method for use with a topological quantum computing device is provided. The method may include setting a plurality of device parameters for a qubit architecture including a plurality of Majorana zero modes (MZMs). The method may further include calibrating the plurality of device parameters at least in part by determining whether the plurality of MZMs exhibit ground state degeneracy. When the plurality of MZMs are determined to not exhibit ground state degeneracy, calibrating the plurality of device parameters may further include modifying one or more device parameters of the plurality of device parameters. When the plurality of MZMs are determined to exhibit ground state degeneracy, the method may further include modifying one or more parameters of a measurement device coupled to the qubit architecture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

When a topological quantum computing device is constructed, each topological qubit included in the topological quantum computing device may have a respective set of device parameters that affect the usability of that topological qubit to perform computations. Example parameters may include one or more plunger gate voltages, one or more cutter gate voltages, one or more quantum dot voltages, or an external magnetic field strength, as discussed in further details below. The values of such parameters may affect the amount of noise introduced into the qubit system when measurements are performed. For example, noise may be introduced into the qubit system via quasiparticle poisoning, pairwise dephasing, or hybridization. In some regions of parameter space, the amount of measurement noise may be above a threshold level of acceptable noise. Thus, when the parameters of the topological qubit are in such regions of parameter space, the topological qubit may not be usable for performing accurate quantum computations.

The manufacturing process for the topological qubits included in the topological quantum computing device may include performing testing procedures on the topological qubits to determine whether the device parameters of those topological qubits are within an acceptable region of parameter space. When a topological qubit is outside the acceptable region, the parameters of the topological qubit may be modified. Current methods of testing and modifying the parameters of a topological qubit typically involve either detecting the presence of a pair of MZMs in an individual topological superconducting wire or testing properties of the full qubit. However, when these existing methods are used to test the behavior of a qubit, a large number of parameters may have to be adjusted in order to bring the topological qubit into the desired region of parameter space. In addition, the parameters of the qubit may have complicated interdependencies that may make the qubit testing and parameter tuning process more difficult and expensive.

Figure 1:
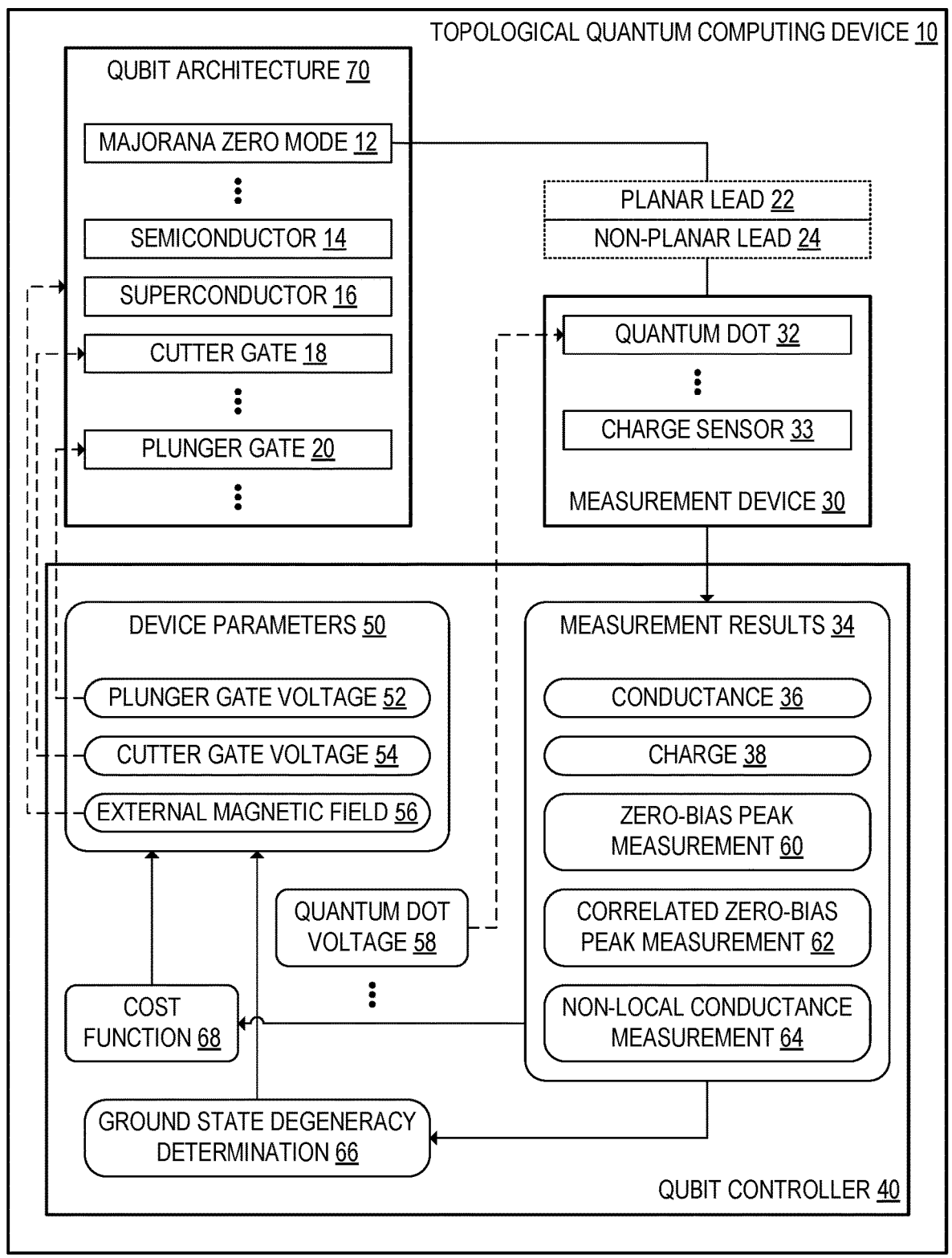
FIG. 1 schematically shows a topological quantum computing device including a qubit architecture, according to one example embodiment.

In order to address the above difficulties, a topological quantum computing device 10 is provided, as shown schematically in the example of FIG. 1. The topological quantum computing device 10 may include a qubit architecture 70 including a plurality of MZMs 12. It will be appreciated that the qubit architecture is the three-dimensional physical structure at which one or more qubits are instantiated during operation of the topological quantum computing device 10. Each MZM 12 may, for example, be formed at a junction between a semiconductor 14 and a superconductor 16, each of which may be formed as a wire. The plurality of superconducting wires may form a superconducting island at which each of the MZMs 12 is formed. The qubit architecture 70 may, for example, be a Majorana tetron that includes four MZMs as part of the qubit and two ancillary MZMs. As another example, the qubit architecture 70 may be a Majorana hexon that includes six MZMs as part of the qubit and two ancillary MZMs. Other numbers of qubit MZMs or ancillary MZMs may alternatively be included in the qubit architecture 70.

In addition, the qubit architecture 70 may include one or more cutter gates 18 and one or more plunger gates 20. The one or more cutter gates 18 and the one or more plunger gates 20 may be opened or closed to set the voltages applied to different portions of the qubit architecture 70 and to open or close junctions between the semiconductor 14 and the superconductor 16. In addition, the cutter gates 18 may be used to open or close electrical connections between regions of the semiconductor 14. Each plunger gate 20 may be located proximate to a semiconducting or superconducting wire between two of the MZMs 12 included in the qubit architecture 70. As discussed in further detail below, the plunger gates 20 located proximate to superconducting wires may be used to adjust respective topological phases of the MZMs 12 via adjustments to the plunger gate voltages 52 of those plunger gates 20.

The topological quantum computing device 10 may further include a measurement device 30. The measurement device 30 may include a plurality of quantum dots 32 coupled to the qubit architecture 70. Each quantum dot 32 included in the measurement device 30 may be electrically coupled to a corresponding pair of MZMs 12. The quantum dots 32 may be coupled to the qubit architecture 70 by a plurality of electrical leads. In some examples, the qubit architecture 70 may have a substantially flat shape. In such examples, the plurality of electrical leads may include a plurality of planar leads 22 located in the plane of the qubit architecture 70. Additionally or alternatively, the quantum dots 32 may be coupled to the qubit architecture 70 by a plurality of non-planar leads 24 that extend in a direction orthogonal to the plane of the qubit architecture 70. In some examples, a bias voltage may be applied to the qubit architecture 70 via the plurality of electrical leads. Respective quantum dot voltages 58 of the quantum dots 32 may be adjusted by adjusting the plunger gate voltages 52 of plunger gates 20 located proximate to the electrical leads connected to those quantum dots 32.

The topological quantum computing device 10 may further include a qubit controller 40. For example, the qubit controller 40 may be a classical computing device including a processor and memory. The qubit controller 40 may be configured to transmit control signals to the qubit architecture 70, which may include modifications to device parameters 50 of the qubit architecture 70. In addition, the qubit controller 40 may be further configured to receive measurement results 34 from the measurement device 30.

Figure 2A:
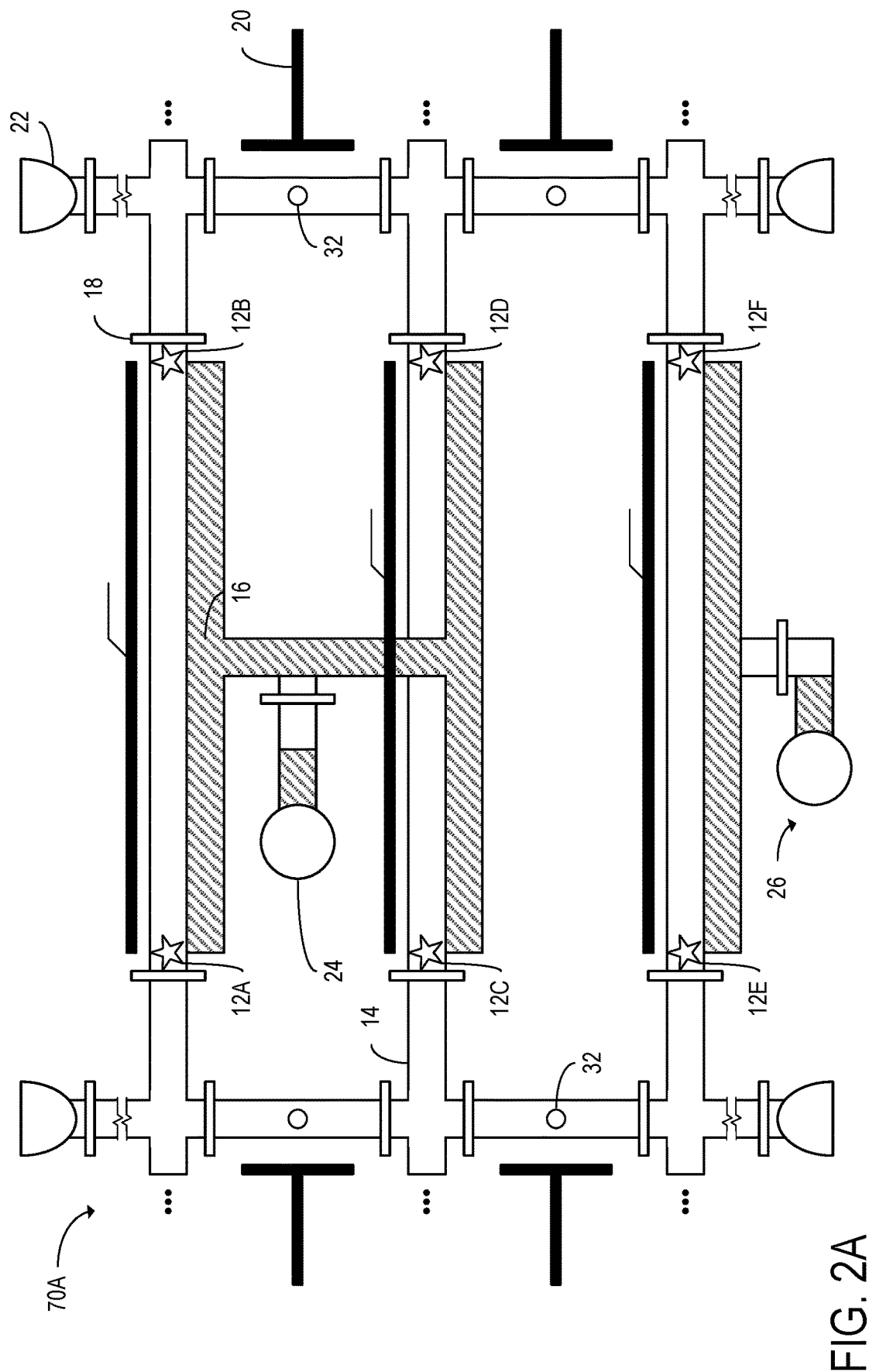
FIGS. 2A-2B show example qubit architectures with Majorana tetron configurations that may be included in the topological quantum computing device of FIG. 1.

FIGS. 2A-3B show example qubit architectures 70 that may be included in the topological quantum computing device 10. The qubit architecture 70A of FIG. 2A may be included in a grid of a plurality of qubits. FIG. 2A shows an example qubit architecture 70A in which the qubit is formed by a Majorana tetron that includes a first MZM 12A, a second MZM 12B, a third MZM 12C, and a fourth MZM 12D as qubit MZMs and includes a fifth MZM 12E and a sixth MZM 12F as ancillary MZMs. The MZMs 12A, 12B, 12C, 12D, 12E, and 12F are all formed at junctions between semiconductors 14 and superconductors 16. In addition, a plurality of planar leads 22 and a plurality of non-planar leads 24 are connected to the qubit architecture 70A. The planar leads 22 and the non-planar leads 24 may electrically couple the MZMs 12 to the measurement device 30. The qubit architecture 70A further includes a plurality of cutter gates 18 and a plurality of plunger gates 20 that may be opened and closed by the qubit controller 40.

In the example of FIG. 2A, the measurement device 30 includes a plurality of quantum dots 32 located in semiconductor wires that are shown running perpendicular to the superconducting wires at which the MZMs 12A, 12B, 12C, 12D, 12E, and 12F are formed. Each quantum dot 32 has a respective quantum dot voltage 58 that may be controlled by setting the respective plunger gate voltage 52 and cutter gate voltages 54 of the plunger gate 20 and cutter gates 18 located proximate to that quantum dot 32.

Figure 2B:
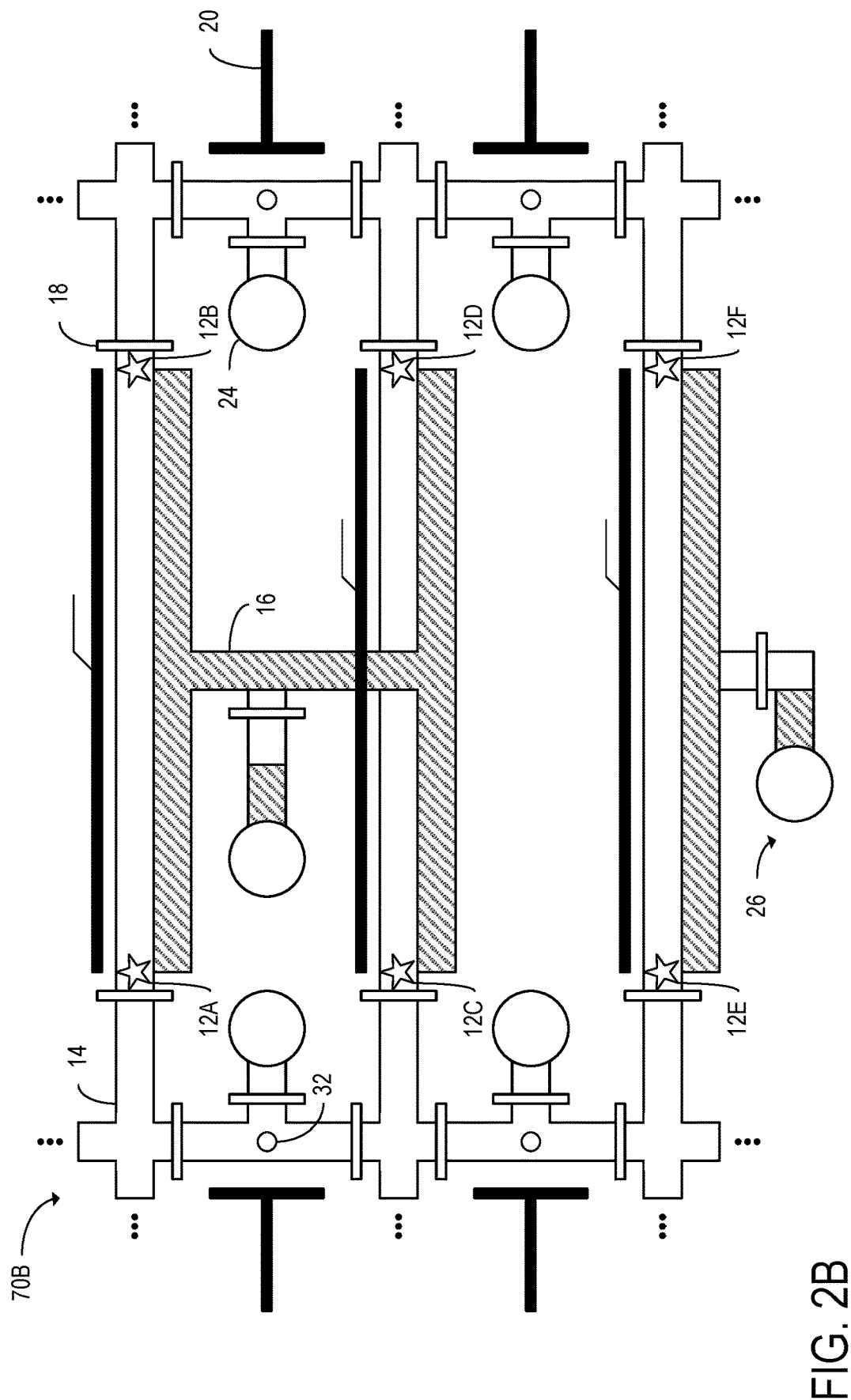

FIG. 2B shows another example qubit architecture 70B that has a Majorana tetron configuration. In the example of FIG. 2B, each lead that connects the qubit architecture 70B to the measurement device 30 is a non-planar lead 24.

Figure 3A:
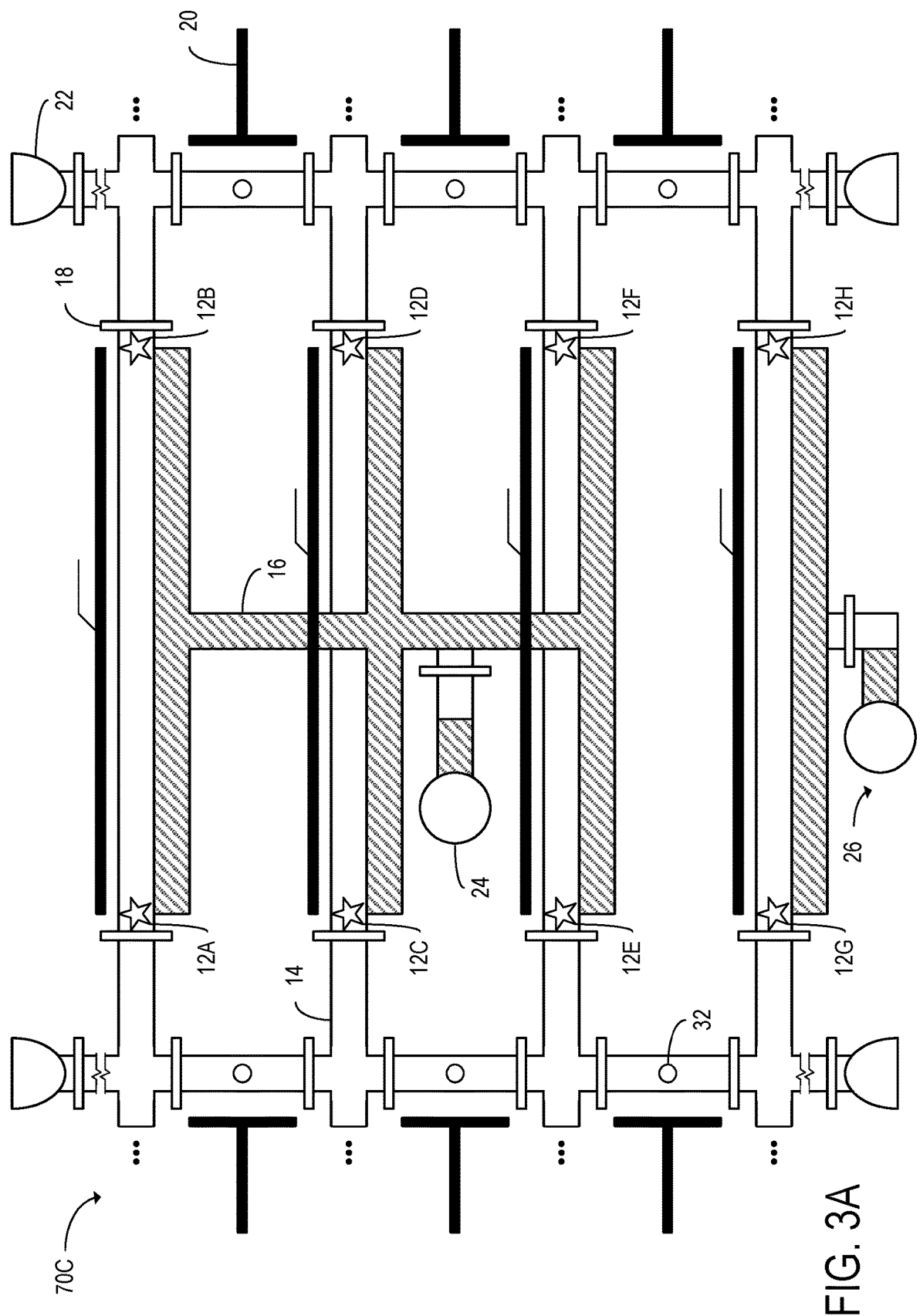
FIGS. 3A-3B show example qubit architectures with Majorana hexon configurations that may be included in the topological quantum computing device of FIG. 1.

FIG. 3A shows another example qubit architecture 70C that has a Majorana hexon configuration. The qubit architecture 70C includes a first MZM 12A, a second MZM 12B, a third MZM 12C, a fourth MZM 12D, a fifth MZM 12E, and a sixth MZM 12F as qubit MZMs. In addition, the qubit architecture 70C includes a seventh MZM 12G and an eighth MZM 12H as ancillary MZMs. The qubit architecture 70C is coupled to the qubit controller 40 by a plurality of planar leads 22 and a plurality of non-planar leads 24. As in the example of FIGS. 2A-2B, a plurality of quantum dots 32 are included in the qubit architecture 70C of FIG. 3A as part of a measurement device 30.

Figure 3B:
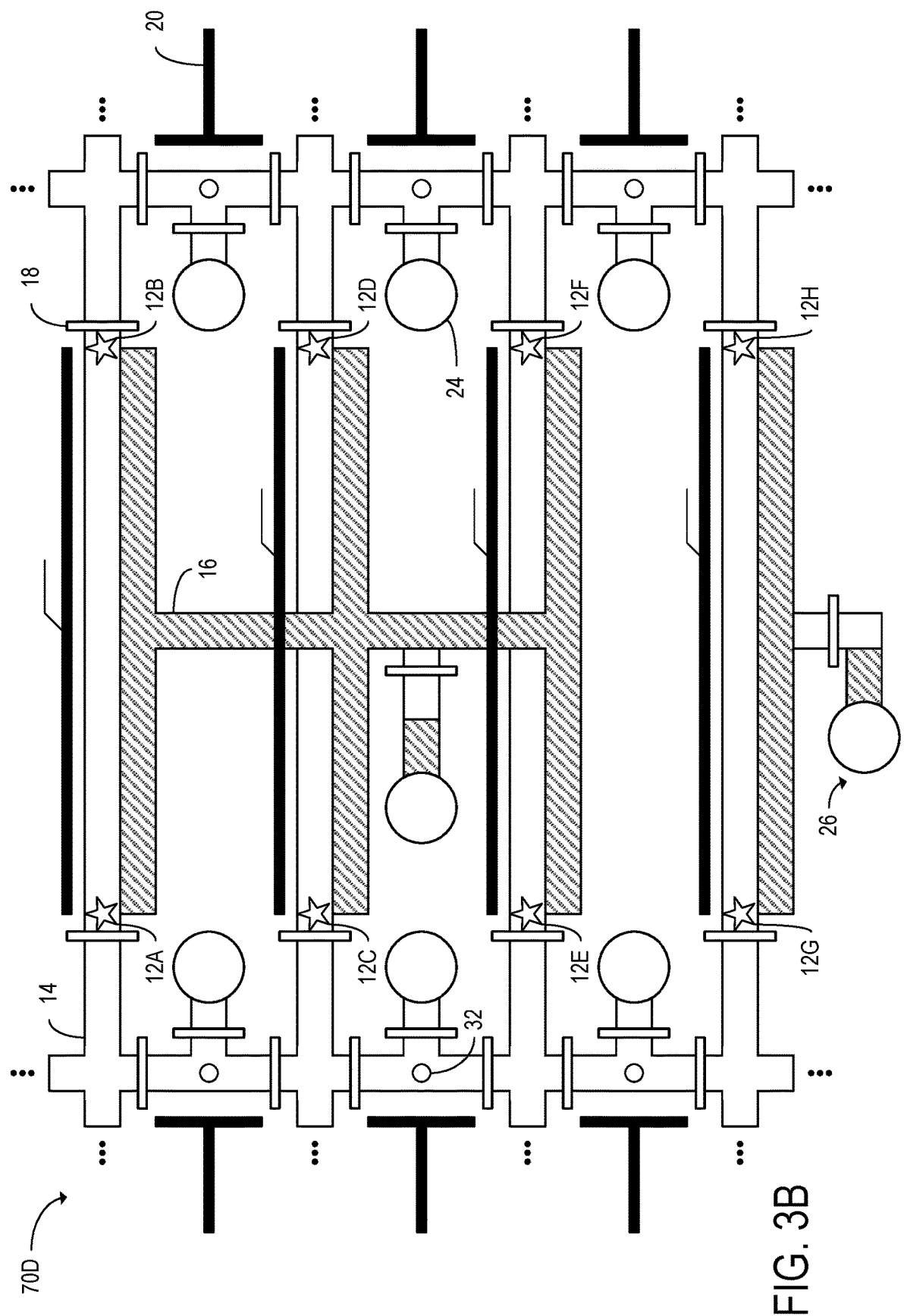

FIG. 3B shows another example qubit architecture 70D that has a Majorana hexon configuration. In the example of FIG. 3B, each lead that connects the qubit architecture 70D to the measurement device 30 is a non-planar lead 24.

Returning to FIG. 1, the qubit controller 40 may be configured to set a plurality of device parameters 50 for the qubit architecture 70 to preliminary values. Fine-tuning of these device parameters 50 may be performed later, as discussed in further detail below. The plurality of device parameters 50 may include one or more plunger gate voltages 52 of the one or more respective plunger gates 20 included in the qubit architecture 70. The plurality of device parameters 50 may additionally or alternatively include one or more cutter gate voltages 54 of one or more respective cutter gates 18 included in the qubit architecture 70. Additionally or alternatively, the plurality of device parameters 50 may further include a strength of an external magnetic field 56 applied to the qubit architecture 70. The qubit architecture 70 may have one or more other device parameters 50 in other embodiments.

When the qubit controller 40 sets preliminary values of the device parameters 50, the measurement device 30 may be configured to perform one or more zero bias peak measurements 60, correlated zero bias peak measurements 62, or non-local conductance measurements 64 at the qubit architecture 70. A zero bias peak measurement 60 may return a value of the conductance across a semiconductor-superconductor boundary at which an MZM 12 is formed when a bias voltage of the semiconductor 14 is set to zero. The zero bias peak measurement 60 may be a local conductance measurement performed between the electrical leads connected to two MZMs 12 included in the same superconducting wire. A correlated zero bias peak measurement 62 may return a relationship between the conductance values of two MZMs 12 when the bias voltage is set to zero. For example, the correlated zero bias peak measurement 62 may return a difference between the respective zero bias peak conductance values for a first MZM 12 and a second MZM 12. A non-local conductance measurement 64 may return a value of an energy gap in the semiconductor 14.

The qubit controller 40 may be further configured to set the plurality of device parameters 50 for the qubit architecture 70 based at least in part on results of the one or more zero bias peak measurements 60, correlated zero bias peak measurements 62, or non-local conductance measurements 64. The one or more zero bias peak measurements 60, correlated zero bias peak measurements 62, or non-local conductance measurements 64 may be used to identify, at the qubit controller 40, a region of parameter space in which the MZMs 12 operate in a topological mode (i.e. a mode in which an MZM is formed at the junction between the semiconductor 14 and the superconductor 16) rather than a trivial mode (i.e. a mode in which the junction between the semiconductor 14 and the superconductor 16 does not act as an MZM). The qubit controller 40 may be configured to identify a topological phase boundary between the topological region and the trivial region, and may be further configured to set the initial values of the device parameters 50 such that each of the MZMs 12 is in the topological region. Thus, the qubit controller 40 may narrow the ranges within which the device parameters 50 are adjusted when tuning the qubit architecture 70. The preliminary values of the device parameters 50 may be set for each superconducting wire at the ends of which a pair of MZMs 12 is located.

Zero bias peak measurements 60, correlated zero bias peak measurements 62, and non-local conductance measurements 64 each have respective measurement signatures that may indicate the topological mode. A zero bias peak measurement 60 may indicate that the junction between the semiconductor 14 and the superconductor 16 is in the topological mode when conductance measurements performed for the semiconductor wire have a peak at or near a bias voltage of zero. A correlated zero bias peak measurement 62 may indicate that the junction is in the topological mode when both ends of the semiconductor wire have peak conductance values at or near a bias voltage of zero. The non-local conductance measurement 64 may indicate a phase transition from the trivial mode to the topological mode when an energy gap within the bulk of the semiconductor wire closes and then reopens as the strength of an external magnetic field 56 increases.

In some examples, when the qubit controller 40 sets the initial values of the device parameters 50, the qubit controller 40 may be configured to perform zero bias peak measurements 60 and correlated zero bias peak measurements 62 over a large area of parameter space. The qubit controller 40 may be further configured to identify regions of parameter space that have the zero bias peak and correlated zero bias peak signatures discussed above. In addition, the qubit controller 40 may be further configured to test for the topological phase transition signature using non-local conductance measurements 64 as discussed above.

In some examples, as shown in FIGS. 2A-3B, the qubit architecture 70 may include at least one Josephson junction 26 that connects the superconductor 16 to a grounded electrical lead. In the examples of FIGS. 2A-3B, the grounded electrical leads are non-planar leads 24. Each Josephson junction 26 may be formed by a semiconducting wire and a cutter gate 18 located between two superconducting wires. The cutter gate voltage 54 of the cutter gate 18 may be controlled by the qubit controller 40 to set the strength of the Josephson coupling between the superconductor 16 and ground. When the cutter gate 18 is open, the superconductor 16 at which the MZMs 12 are formed may be grounded. When the cutter gate 18 is closed, the superconductor 16 may be decoupled from ground, thus preventing a quasiparticle current from flowing through the Josephson junction 26.

In examples in which the qubit architecture 70 includes a Josephson junction 26, the qubit controller 40 may be configured to connect the superconductor 16 included in the qubit architecture 70 to ground via a Josephson junction 26 and subsequently perform the one or more zero bias peak measurements 60 while the superconductor 16 is grounded. The qubit controller 40 may be further configured to set the plurality of device parameters 50 for the qubit architecture 70 based at least in part on the one or more zero bias peak measurements 62, as discussed above, and disconnect the superconductor 16 from ground. The one or more zero bias peak measurements 60 may be performed when the qubit architecture is grounded, whereas the ground state degeneracy tests discussed below may be performed when the qubit architecture 70 is disconnected from ground. By using a Josephson junction to ground and unground the qubit architecture 70, grounding the qubit architecture 70 via the MZMs 12 may be avoided.

In some examples, as an alternative to a Josephson junction, some other type of junction may be used to ground the qubit architecture 70 prior to performing the one or more zero bias peak measurements 60. In such examples, the junction may be formed without using another superconductor in addition to the superconductor 16 of the superconducting island. Similarly to the Josephson junction 26, the junction may inhibit a quasiparticle current from flowing from the superconducting island to ground when the junction is closed.

Subsequently to setting the initial values of the device parameters 50, the qubit controller 40 may be further configured to calibrate the plurality of device parameters 50. Calibrating the plurality of device parameters 50 may include determining whether the plurality of MZMs 12 included in the qubit architecture 70 exhibit ground state degeneracy. In addition, when the plurality of MZMs 12 are determined to not exhibit ground state degeneracy, such calibration may include tuning the device parameters 50 to achieve at least approximate degeneracy of the ground state of the plurality of MZMs 12. For a system of N MZM pairs, the degeneracy of the ground state may be $2^{N-1}$. It will be appreciated that the minimum number of MZM pairs is two, and therefore detecting ground state degeneracy among a plurality MZMs typically includes detecting ground state degeneracy among four or more MZMs. Since the system has application not only to tetrons, but also to hexons, octons, and possibly higher-order configurations, it will be appreciated that the ground state degeneracy may alternatively be determined between four, six, or eight MZMs, or possibly more.

When the qubit architecture 70 has ground state degeneracy or approximate ground state degeneracy, the qubit architecture 70 may be usable for performing computations. Thus, by determining whether each MZM 12 in the qubit architecture 70 has the ground state degeneracy, the qubit controller 40 may check to usability of the qubit architecture 70 without having to determine the values of a large number of properties of the qubit architecture 70. In addition, existing methods of testing whether qubits are usable may be likely to return false positives. However, as discussed in further detail below, the measurement signatures associated with ground state degeneracy are unlikely to occur in qubit architectures that are not operating in the topological regime.

In some examples, the qubit controller 40 may be configured to determine whether the plurality of MZMs 12 exhibit ground state degeneracy at least in part by determining whether the topological Kondo effect occurs for a subset of the plurality of MZMs 12. In order to determine whether the topological Kondo effect is occurring for the MZMs 12, the qubit controller 40 may be further configured to measure a conductance 36 between a first MZM 12 of the plurality of MZMs 12 and a second MZM 12 of the plurality of MZMs 12. This conductance measurement may be performed when the first MZM 12, the second MZM 12, and at least a third MZM 12 of the plurality of MZMs 12 are connected to respective electrical leads, for example by opening cutter gates 18 located between those MZMs 12 and the electrical leads. When the conductance 36 is measured, one of the electrical leads may be provided with a bias voltage while the other electrical leads are grounded.

The qubit controller 40 may be further configured to determine whether the plurality of MZMs 12 exhibit ground state degeneracy based on the conductance 36. This determination may be made by determining whether the topological Kondo effect occurs for the plurality of MZMs 12. The topological Kondo effect may occur below a Kondo temperature $T_K$, which may depend upon the charging energy $E_C$ and the topological gap $\Delta_P$ of the superconductor 16. When the topological Kondo effect occurs, the Coulomb blockade effect is suppressed. As the temperature of the qubit architecture 70 tends toward zero, the conductance between two electrical leads i and j may tend toward a constant value $G_{i \neq j} = G_0/M$, where $G_0 = 2e^2/h$, e is the charge of the electron, h is the Planck constant, and M is the number of MZMs 12 which are connected to electrical leads.

The above equation for the conductance may hold when M>2. When M=2, measuring a conductance value of $G_{i \neq j} = G_0/2$ may be insufficient to determine that the plurality of MZMs 12 exhibit ground state degeneracy, since there are trivial states as well as topological states that may have a conductance of $G_0/2$ when M=2. Thus, as discussed above, the qubit controller 40 may be configured to connect at least a third MZM 12 to a respective electrical lead when the conductance measurement is performed. For example, the third MZM 12 may be grounded by opening a cutter gate 18 located proximate to the third MZM 12. After the cutter gate 18 connected to the third MZM 12 is opened, the conductance 36 may be equal to $G_{i \neq j} = G_0/3$. The qubit controller 40 may be configured to determine that the MZMs 12 exhibit ground state degeneracy when the conductance 36 is approximately equal to the value of $G_{i \neq j}$ shown above. The qubit controller 40 may be further configured to output a ground state degeneracy determination 66 indicating that the plurality of MZMs 12 exhibit ground state degeneracy when the conductance 36 has the above value, and may be configured to output a ground state degeneracy determination 66 indicating that the plurality of MZMs 12 do not exhibit ground state degeneracy when the conductance 36 has some other value.

In some examples, the qubit controller 40 may be further configured to disconnect the third MZM 12 from its respective electrical lead and measuring a change in the conductance 36 when the third MZM 12 is disconnected. Thus, the value of M may be initially set to 3 and then decreased to 2. The change in the conductance 36 when M is lowered to 2 may be used when the qubit controller 40 makes the ground state degeneracy determination 66. Alternatively, the value of M may be initially set to 2 and then increased to 3 by connecting the third MZM 12 to its respective electrical lead.

In some examples, the qubit controller 40 may be further configured to perform a plurality of conductance measurements when different sets of MZMs 12 are connected to respective terminals. For example, each of these conductance measurements may be performed when three MZMs 12 are connected to electrical leads such that M=3. Based on the results of the plurality of conductance measurements, the qubit controller 40 may be further configured to identify one or more MZMs 12 of the plurality of MZMs 12 that do not contribute to ground state degeneracy.

When the qubit controller 40 determines whether the MZMs 12 exhibit ground state degeneracy based on conductance measurements, the qubit controller 40 may be further configured to compute a temperature-dependent correction to the conductance 36. With this correction, the conductance 36 may be given by the equation $$G_{i \neq j} = \frac{G_0}{M} - \delta G \text{ where}$$

$$\delta G = cT^{2\left(1 - \frac{2}{M}\right)}$$

in which c is a temperature-independent constant.

In some examples, charge sensing may additionally or alternatively be performed to determine whether the plurality of MZMs 12 exhibit ground state degeneracy. In this example, the measurement device 30 may further include a charge sensor 33 with which a charge 38 on the qubit architecture 70 may be measured. For example, the charge sensor 33 may be a quantum dot or a quantum point contact. When charge sensing is used to test for ground state degeneracy, the qubit controller 40 may be configured to modify a plunger gate voltage 52 of the one or more plunger gate voltages 52. Via the charge sensor 33 included in the measurement device 30, the qubit controller 40 may be further configured to measure a change in the charge 38 on a superconductor included in the qubit architecture 70 as the plunger gate voltage 52 is modified. The change in the charge 38 may be a change in the charge of the superconducting island formed by the superconducting wires.

The qubit controller 40 may then determine whether the plurality of MZMs 12 exhibit ground state degeneracy based on the change in the charge 38. The ground state degeneracy determination 66 may be made based on the change in the charge 38 when $E_C \ll \Delta_P$, where $E_C$ is the charging energy of the superconductor 16 and OP is the topological gap of the superconductor 16. When the MZMs 12 exhibit ground state degeneracy, the charge 38 on the superconductor 16 may vary according to the equation $$\frac{Q}{e} = N_g + a\sin(2\pi N_g)$$

where $N_g$ is a dimensionless gate charge given by the equation $$N_g = C_g V_g / e$$

in which $C_g$ is the capacitance of the plunger gate 20 and $V_g$ is the plunger gate voltage 52. In the equation for the charge 38 on the superconductor 16, a is a constant proportional to $$\left(\frac{E_C}{\Delta_P}\right)^M.$$

Thus, by varying the plunger gate voltage 52 and measuring the charge 38 on the superconductor 16, the qubit controller 40 may determine whether the charge 38 has the dependence on the plunger gate voltage 52 specified by the above equations.

When the qubit controller 40 determines that at least one MZM 12 of the plurality of MZMs 12 does not contribute to the ground state degeneracy (i.e. in response to determining that the plurality of MZMs do not exhibit ground state degeneracy or exhibit a lower ground state degeneracy than expected for the number of MZMs included in the qubit architecture), the qubit controller 40 may be further configured to modify one or more device parameters 50 of the plurality of device parameters 50. In examples in which the plurality of device parameters 50 includes one or more plunger gate voltages 52, modifying the one or more device parameters 50 may include modifying the plunger gate voltage 52 of a plunger gate 20. The plunger gate 20 for which the plunger gate voltage 52 is modified may be a plunger gate 20 located proximate to the first MZM 12 and the second MZM 12 or may alternatively be a plunger gate 20 located proximate to another pair of MZMs 12. The plunger gate voltage 52 may be modified such that the conductance 36 measured for the pair becomes closer to the topological-regime conductance value $G_0/M$. The equation $G_{i\neq j}=G_0/M$ provides a theoretical maximum conductance that occurs when the plurality of MZMs 12 exhibit ground state degeneracy and $\delta G=0$, although higher conductance values may be reachable in some areas of parameter space outside the topological region.

In some examples, additionally or alternatively to modifying one or more plunger gate voltages 52, the qubit controller 40 may be configured to modify one or more cutter gate voltages 54 or the strength of the external magnetic field 56 applied to the qubit architecture 70 when the qubit controller 40 determines that the plurality of MZMs 12 do not exhibit the ground state degeneracy. For example, when at least one MZM 12 included in the qubit architecture 70 is outside the topological regime, the qubit controller 40 may be configured to open a cutter gate 18 included in a Josephson junction 26 to decrease the charging energy $E_C$ of the qubit architecture 70.

In some examples, the qubit controller 40 may be further configured to compute a value of a cost function 68 based on the measurement results 34. The cost function 68 may be a function of the conductance values measured for each pair of MZMs 12 at which a conductance measurement is performed. For example, the cost function 68 may be a least-squares function of the differences between the measured conductance 36 for each pair and the theoretical topological-regime conductance $G_{i\neq j}$ for that pair. The qubit controller 40 may be further configured to apply an optimization technique such as gradient descent, stochastic optimization, reinforcement learning, or some other optimization technique to the cost function 68. When the qubit controller 40 applies one of these optimization techniques to the cost function 68, the qubit controller 40 may be configured to perform a plurality of parameter updating iterations. In each parameter updating iteration, the qubit controller 40 may be configured to perform conductance measurements for one or more pairs of MZMs 12 as discussed above. The qubit controller 40 may then compute the value of the cost function 68 using the measured conductance values as inputs. The qubit controller 40 may be further configured to adjust the values of one or more of the device parameters 50 based on the computed value of the cost function 68 according to the specified optimization technique. In addition to the current value of the cost function 68, the optimization technique may also take one or more previous values of the cost function 68 computed during previous iterations as inputs. For example, when the qubit controller 40 is configured to use gradient descent, the qubit controller 40 may compute one or more estimated derivatives of the cost function 68 based on a current value of the cost function 68 and one or more prior values of the cost function 68.

By modifying the device parameters 50 of the qubit architecture 70 as discussed above, the qubit controller 40 may be configured to calibrate the device parameters 50 such that each MZM 12 operates in the topological regime and is thereby usable for performing computations. When the plurality of MZMs 12 are determined to exhibit ground state degeneracy (i.e., in response to determining that each MZM 12 of the plurality of MZMs 12 contributes to the ground state degeneracy), the qubit controller 40 may be further configured to modify one or more measurement device parameters of the measurement device 30 coupled to the qubit architecture 70. The one or more measurement device parameters may include respective quantum dot voltages 58 of the plurality of quantum dots 32 coupled to the MZMs 12. In some examples, other parameters of the measurement device 30 may additionally or alternatively be modified.

By calibrating the measurement device 30 separately from the MZMs 12, the qubit controller 40 may avoid having to account for dependencies between the device parameters 50 and the measurement device parameters. Thus, calibrating the device parameters 50 and the measurement device parameters separately may reduce the number of parameters that have to be modified and the area of parameter space that has to be searched in order to obtain a usable qubit.

Figure 4A:
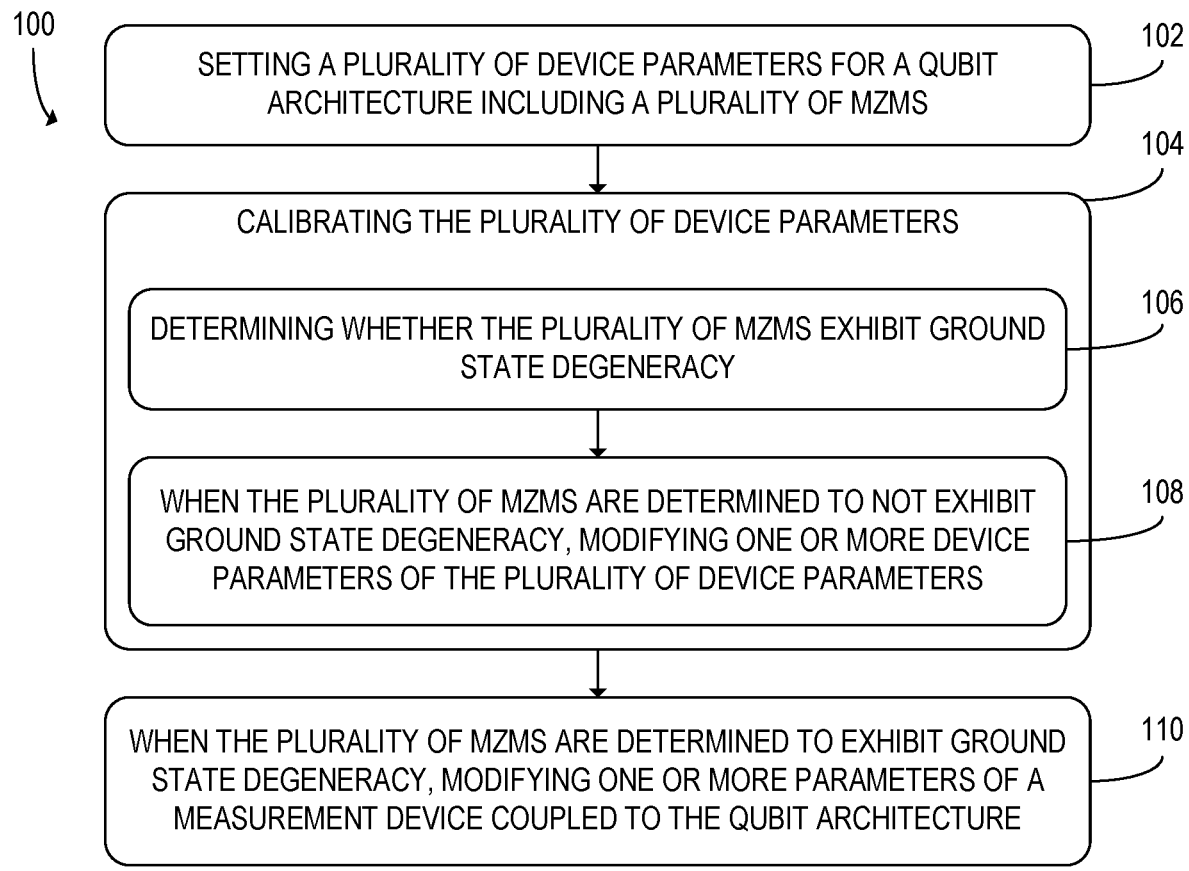
FIG. 4A shows a flowchart of an example method that may be used with the topological quantum computing device of FIG. 1.

A method 100 for testing and modifying the parameters of a qubit architecture is provided, as shown in the example flowchart of FIG. 4A. The steps of the method 100 may each be performed at the topological quantum computing device 10 of FIG. 1 or at a topological quantum computing device with some other configuration. At step 102, the method 100 may include setting a plurality of device parameters for a qubit architecture including a plurality of MZMs. The plurality of device parameters may, for example, include one or more plunger gate voltages, one or more cutter gate voltages, or a strength of an external magnetic field. The values of the parameters that are set at step 102 may be initial values that may be adjusted in later steps of the method 100.

Figure 4B:
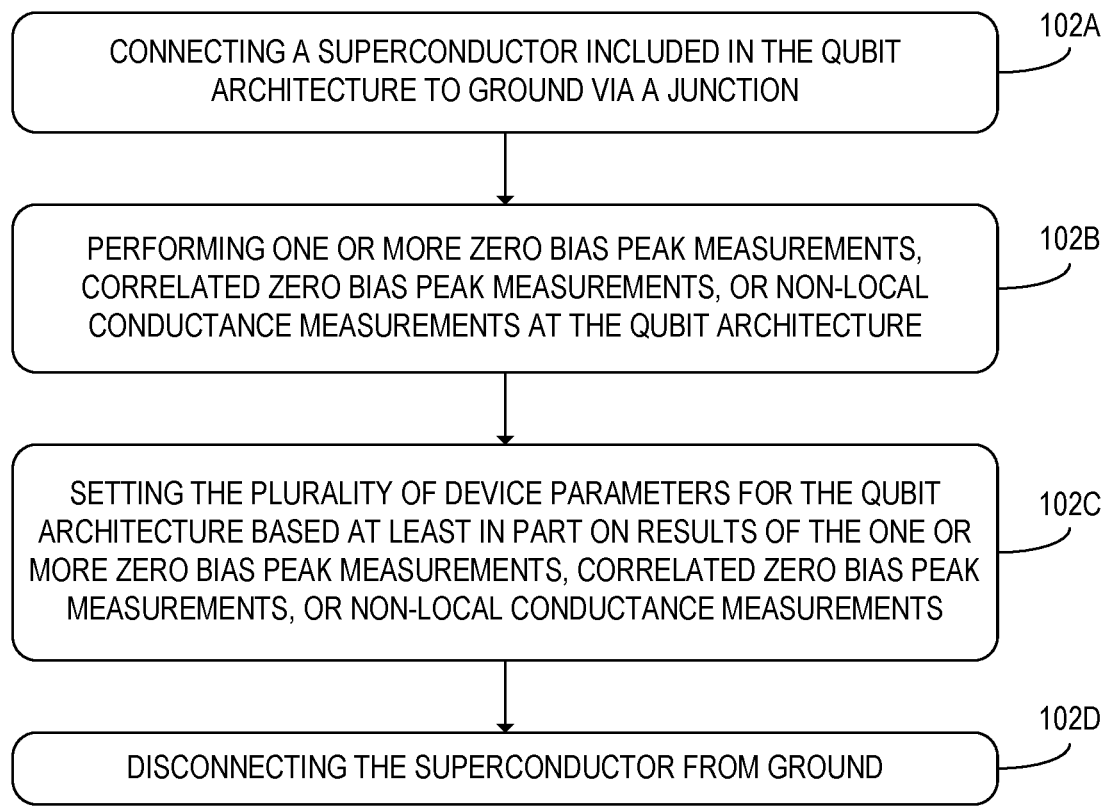
FIG. 4B shows steps of the method of FIG. 4A that may be performed to set one or more device parameters of the qubit architecture.

In some examples, step 102 includes pre-screening steps that are performed in order to select a region of the parameter space within which further adjustments to the device parameters may be made. These pre-screening steps are shown in the example of FIG. 4B. In some examples, step 102 may include, at step 102A, connecting a superconductor included in the qubit architecture to ground via a junction. For example, the junction may include a cutter gate that may be opened to connect the superconductor to ground. The junction may be a Josephson junction in some examples, or may alternatively be some other type of junction.

At step 102B, step 102 may further include performing one or more zero bias peak measurements, correlated zero bias peak measurements, or non-local conductance measurements at the qubit architecture. Each of these measurements may be performed using a measurement device coupled to the MZMs of the qubit architecture. A zero bias peak measurement may return a value of the conductance across a semiconductor-superconductor boundary at which an MZM is formed when a bias voltage of the semiconductor is set to zero. A correlated zero bias peak measurement may return a relationship between the conductance values of two MZMs when the bias voltage is set to zero. A non-local conductance measurement may return a value of an energy gap in the semiconductor wire.

At step 102C, step 102 may further include setting the plurality of device parameters for the qubit architecture based at least in part on results of the one or more zero bias peak measurements, correlated zero bias peak measurements, or non-local conductance measurements. The one or more zero bias peak measurements, correlated zero bias peak measurements, and non-local conductance measurements may each have corresponding measurement signatures that indicate that the junctions between one or more superconductors and one or more semiconductors in the qubit architecture form MZMs. When the device parameters are set based on the results of a zero bias peak measurement, correlated zero bias peak measurement, or non-local conductance measurement, the qubit controller may be configured to identify a topological phase boundary between a topological region of parameter space and a trivial region of parameter space based on the measurement results. The parameters of the qubit architecture may then be set such that the qubit architecture operates within the topological region. Thus, at step 102C, the qubit architecture may be pre-screened such that preliminary parameter values that allow the qubit system to operate within the topological region may be selected.

At step 102D, step 102 may further include disconnecting the superconductor from ground. In examples in which the qubit architecture includes a junction that includes a cutter gate, the superconductor may be disconnected from ground by closing the cutter gate. When the superconductor is disconnected from ground, a quasiparticle current may be prevented from flowing to the superconductor.

Returning to FIG. 4A, the method 100 may further include, at step 104, calibrating the plurality of device parameters. At step 106, step 104 may include determining whether the plurality of MZMs exhibit ground state degeneracy. The plurality of MZMs may be used to perform quantum computations when the plurality of MZMs exhibit ground state degeneracy. When step 106 is performed, one or more MZMs that contribute to the ground state degeneracy and/or one or more MZMs that do not contribute to the ground state degeneracy may be identified.

Figure 4C:
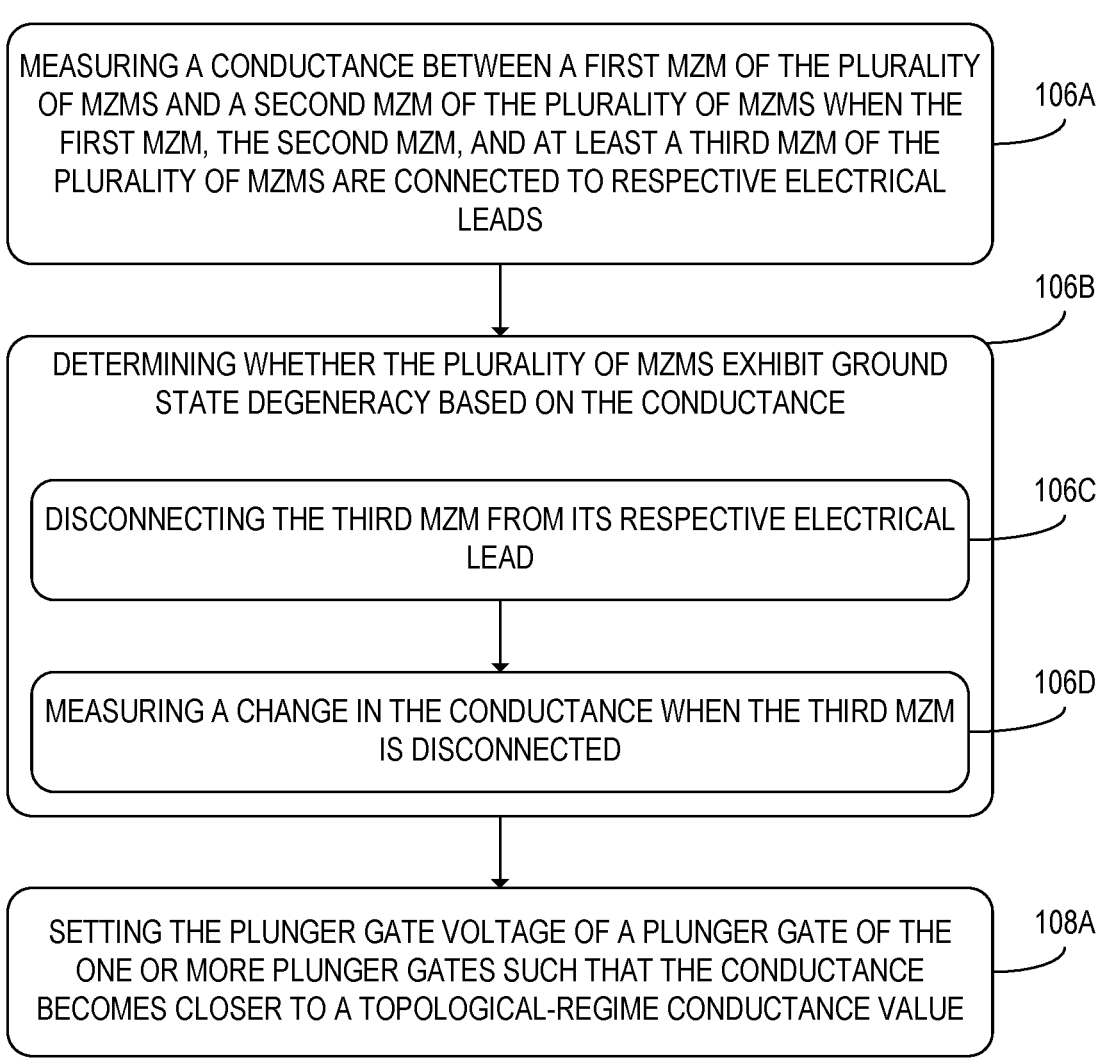
FIG. 4C shows steps of the method of FIG. 4A that may be performed to determine whether a plurality of Majorana zero modes included in the qubit architecture exhibit ground state degeneracy based on one or more conductance measurements.

FIG. 4C shows example steps of the method 100 that may be performed during step 106 when determining whether the plurality of MZMs exhibit ground state degeneracy. At step 106A, the step 106 may include measuring a conductance between a first MZM of the plurality of MZMs and a second MZM of the plurality of MZMs when the first MZM, the second MZM, and at least a third MZM of the plurality of MZMs are connected to respective electrical leads. The conductance may be measured between the electrical leads connected to the first MZM and the second MZM. When the conductance is measured, a bias voltage may be applied to the first electrical lead or the second electrical lead while the other electrical leads are grounded. At step 106B, step 106 may further include determining whether the plurality of MZMs exhibit ground state degeneracy based on the conductance. This determination may be made at least in part by comparing the measured conductance to a theoretical value of the conductance for a pair of MZMs when the plurality of MZMs exhibit ground state degeneracy.

Determining whether the MZMs exhibit ground state degeneracy based on the measured conductance may further include, at step 106C, disconnecting the third MZM from its respective electrical lead. The third MZM may be disconnected by closing a cutter gate connected to the third MZM. At step 106D, determining whether the MZMs exhibit ground state degeneracy may further include measuring a change in the conductance when the third MZM is disconnected. Subsequently to the measurement of the conductance when the third MZM is disconnected from its respective electrical lead, the presence or absence of the ground state degeneracy may be determined by comparing the conductance value measured with the third MZM disconnected to a theoretical conductance value predicted for a qubit architecture with a connected third MZM when the pair has the ground state degeneracy.

Returning to FIG. 4A, calibrating the plurality of device parameters at step 104 may further include, at step 108, modifying one or more device parameters of the plurality of device parameters when the plurality of MZMs are determined to not exhibit ground state degeneracy (i.e. in response to determining that the plurality MZMs do not exhibit ground state degeneracy). For example, when the presence or absence of the ground state degeneracy for the MZMs is determined based on a conductance measurement, as shown in FIG. 4C, step 108 may include step 108A. At step 108A, when the MZMs do not exhibit ground state degeneracy, the method 100 may further include setting the plunger gate voltage of a plunger gate of the one or more plunger gates such that the conductance becomes closer to a topological-regime conductance value. Thus, the plurality of MZMs may be brought into the topological regime by bringing the conductance between the pair of MZMs closer to the theoretical maximum conductance. Additionally or alternatively to modifying a plunger gate voltage, modifying the one or more device parameters may further include modifying one or more cutter gate voltages or an external magnetic field strength.

Figure 4D:
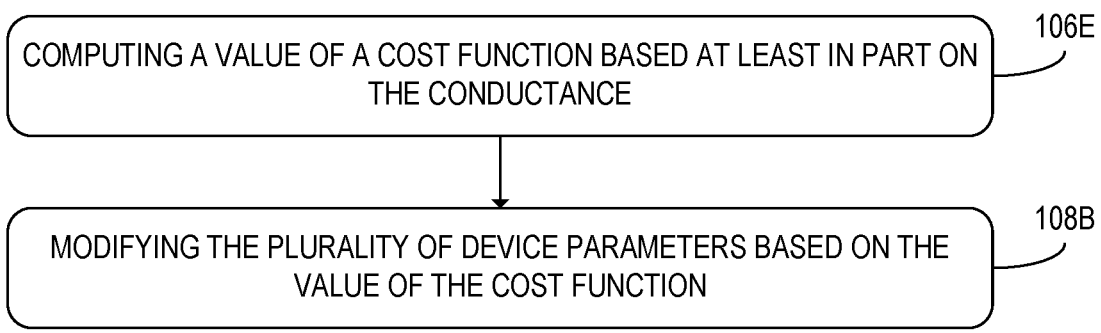
FIG. 4D shows steps of the method of FIG. 4A that may be performed when determining whether the plurality of Majorana zero modes exhibit ground state degeneracy.

In some examples, as shown in FIG. 4D at step 106E, calibrating the plurality of device parameters may include computing a value of a cost function. For example, when the method 100 includes measuring one or more conductance values, the value of the cost function may be computed based at least in part on the one or more conductance values. In addition, at step 108B, step 108 may further include modifying the plurality of device parameters based on the value of the cost function. Determining whether the plurality of MZMs exhibit ground state degeneracy and modifying the one or more device parameters, as shown at steps 106 and 108, may be repeated over a plurality of iterations. For example, the cost function may be used in an optimization technique such as gradient descent, stochastic optimization, reinforcement learning, or some other optimization technique that is applied over the plurality of iterations to set the values of the device parameters.

Figure 4E:
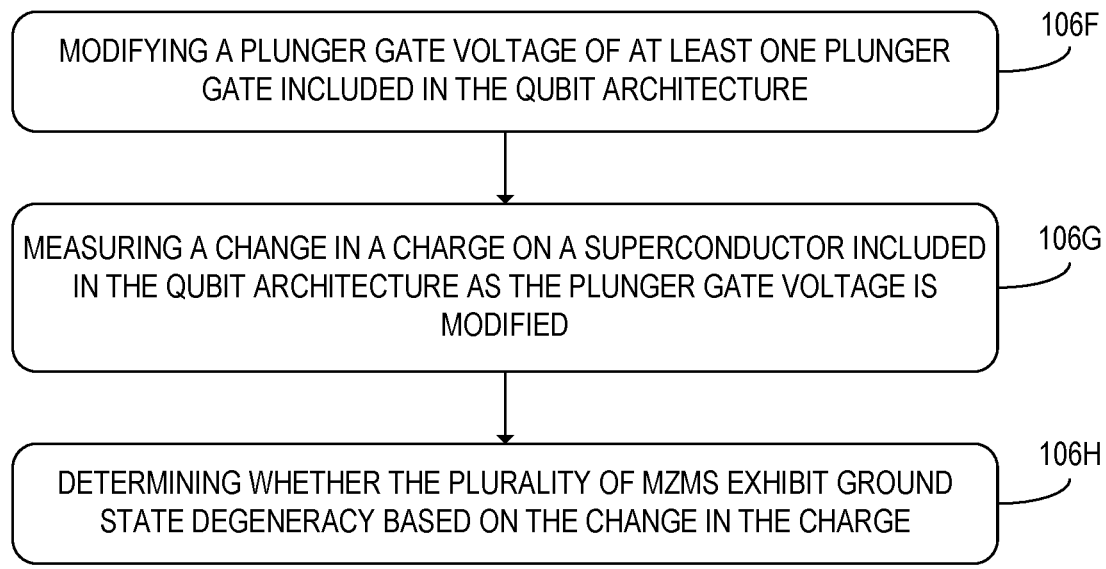
FIG. 4E shows steps of the method of FIG. 4A that may be performed to determine whether a plurality of Majorana zero modes included in the qubit architecture exhibit ground state degeneracy based on one or more charge measurements.

As shown in FIG. 4E, determining whether the plurality of MZMs exhibits ground state degeneracy at step 106 may include performing one or more charge measurements at the qubit architecture additionally or alternatively to the one or more conductance measurements discussed above. At step 106F, step 106 may further include modifying a plunger gate voltage of at least one plunger gate included in the qubit architecture. At step 106G, step 106 may further include measuring a change in a charge on a superconductor included in the qubit architecture as the plunger gate voltage is modified. The change in the charge on the superconductor may be measured using a charge sensor included in the measurement device. At step 106H, step 106 may further include determining whether the plurality of MZMs exhibit ground state degeneracy based on the change in the charge.

Returning to FIG. 4A, the method 100 may further include step 110, which may be performed when the plurality of MZMs are determined to exhibit ground state degeneracy (i.e. in response to determining that the plurality of MZMs exhibit ground state degeneracy). Step 110 may include modifying one or more measurement device parameters of a measurement device coupled to the qubit architecture. In examples in which the measurement device includes a plurality of quantum dots coupled to the MZMs, modifying the one or more measurement device parameters may include modifying respective quantum dot voltages of the quantum dots. Other measurement device parameters may additionally or alternatively be modified during step 110.

With the systems and methods discussed above, topological qubits may be assessed for usability in a topological quantum computing device when the topological quantum computing device is constructed. In addition, the device parameters of the qubit and the measurement device parameters of a measurement device configured to perform measurements on the qubit may be tuned to values suitable for performing quantum computations. Using the systems and methods discussed above, the qubit architecture and the measurement device may be tested and calibrated separately, which may allow for such calibration and testing to be performed more quickly and reliably than with existing methods of testing and calibration.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
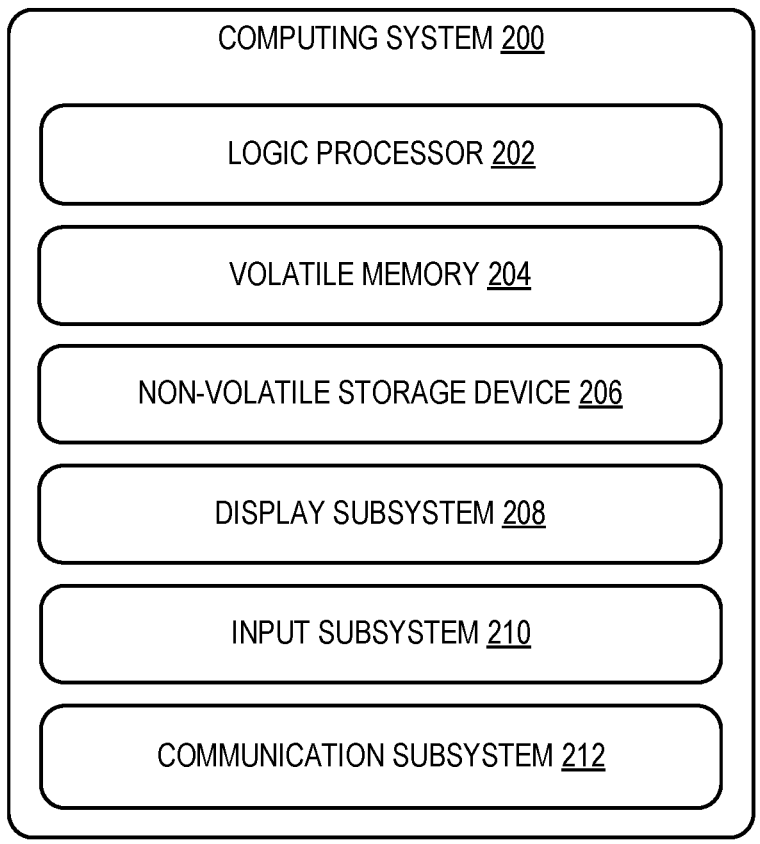
FIG. 5 shows a schematic view of an example computing environment in which the topological quantum computing device of FIG. 1 may be enacted.

FIG. 5 schematically shows a non-limiting embodiment of a computing system 200 that can enact one or more of the methods and processes described above. Computing system 200 is shown in simplified form. Computing system 200 may embody the topological quantum computing device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 5.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

The following paragraphs describe several aspects of the present disclosure. According to one aspect of the present disclosure, a method for use with a topological quantum computing device is provided. The method may include setting a plurality of device parameters for a qubit architecture including a plurality of Majorana zero modes (MZMs). The method may further include calibrating the plurality of device parameters at least in part by determining whether the plurality of MZMs exhibit ground state degeneracy and modifying one or more device parameters of the plurality of device parameters when the plurality of MZMs are determined to not exhibit ground state degeneracy. The method may further include modifying one or more measurement device parameters of a measurement device coupled to the qubit architecture when the plurality of MZMs are determined to exhibit ground state degeneracy.

According to this aspect, determining whether the plurality of MZMs exhibit ground state degeneracy may include measuring a conductance between a first MZM of the plurality of MZMs and a second MZM of the plurality of MZMs when the first MZM, the second MZM, and at least a third MZM of the plurality of MZMs are connected to respective electrical leads. Determining whether the plurality of MZMs exhibit ground state degeneracy may further include determining whether the plurality of MZMs exhibit ground state degeneracy based on the conductance.

According to this aspect, the plurality of device parameters may include one or more plunger gate voltages of one or more respective plunger gates included in the qubit architecture.

According to this aspect, modifying the one or more device parameters may include setting the plunger gate voltage of a plunger gate of the one or more plunger gates such that the conductance becomes closer to a topological-regime conductance value.

According to this aspect, determining whether the plurality of MZMs exhibit ground state degeneracy may further include disconnecting the third MZM from its respective electrical lead and measuring a change in the conductance when the third MZM is disconnected.

According to this aspect, the method may further include computing a value of a cost function based at least in part on the conductance. The method may further include modifying the plurality of device parameters based on the value of the cost function.

According to this aspect, wherein the plurality of device parameters may include one or more cutter gate voltages of one or more respective cutter gates included in the qubit architecture.

According to this aspect, the plurality of device parameters may include a strength of an external magnetic field applied to the qubit architecture.

According to this aspect, the one or more measurement device parameters may include respective quantum dot voltages of a plurality of quantum dots coupled to the MZMs.

According to this aspect, the method may further include performing one or more zero bias peak measurements, correlated zero bias peak measurements, or non-local conductance measurements at the qubit architecture. The method may further include setting the plurality of device parameters for the qubit architecture based at least in part on results of the one or more zero bias peak measurements, correlated zero bias peak measurements, or non-local conductance measurements.

According to this aspect, determining whether the plurality of MZMs exhibit ground state degeneracy may include modifying a plunger gate voltage of at least one plunger gate included in the qubit architecture. Determining whether the plurality of MZMs exhibit ground state degeneracy may further include measuring a change in a charge on a superconductor included in the qubit architecture as the plunger gate voltage is modified.

According to another aspect of the present disclosure, a topological quantum computing device is provided, including a qubit architecture including a plurality of Majorana zero modes (MZMs). The topological quantum computing device may further include a qubit controller configured to set a plurality of device parameters for the qubit architecture. The qubit controller may be further configured to calibrate the plurality of device parameters at least in part by determining whether the plurality of MZMs exhibit ground state degeneracy and modifying one or more device parameters of the plurality of device parameters when the plurality of MZMs are determined to not exhibit ground state degeneracy. The qubit controller may be further configured to modify one or more measurement device parameters of a measurement device coupled to the qubit architecture when the plurality of MZMs are determined to exhibit ground state degeneracy.

According to this aspect, the plurality of device parameters may include at least one of one or more plunger gate voltages of one or more respective plunger gates included in the qubit architecture, one or more cutter gate voltages of one or more respective cutter gates included in the qubit architecture, and a strength of an external magnetic field applied to the qubit architecture.

According to this aspect, the qubit controller may be configured to determine whether the plurality of MZMs exhibit ground state degeneracy at least in part by measuring a conductance between a first MZM of the plurality of MZMs and a second MZM of the plurality of MZMs when the first MZM, the second MZM, and at least a third MZM of the plurality of MZMs are connected to respective electrical leads. The qubit controller may be further configured to determine whether the plurality of MZMs exhibits ground state degeneracy based on the conductance.

According to this aspect, modifying the one or more device parameters may include setting the plunger gate voltage of a plunger gate of the one or more plunger gates such that the conductance becomes closer to a topological-regime conductance value.

According to this aspect, the qubit controller may be further configured to determine whether the plurality of MZMs exhibit ground state degeneracy at least in part by disconnecting the third MZM from its respective electrical lead and measuring a change in the conductance when the third MZM is disconnected.

According to this aspect, the qubit controller may be configured to determine whether the plurality of MZMs exhibit ground state degeneracy at least in part by modifying a plunger gate voltage of one or more plunger gates, measuring a change in a charge on a superconductor included in the qubit architecture as the plunger gate voltage is modified, and determining whether the plurality of MZMs exhibit ground state degeneracy based on the change in the charge.

According to this aspect, the qubit controller may be further configured to perform one or more zero bias peak measurements, correlated zero bias peak measurements, or non-local conductance measurements at the qubit architecture. The qubit controller may be further configured to set the plurality of device parameters for the qubit architecture based at least in part on results of the one or more zero bias peak measurements, correlated zero bias peak measurements, or non-local conductance measurements.

According to this aspect, the measurement device may include a plurality of quantum dots coupled to the qubit architecture. The one or more measurement device parameters may include respective quantum dot voltages of the plurality of quantum dots.

According to another aspect of the present disclosure, a topological quantum computing device is provided, including a qubit architecture including a plurality of Majorana zero modes (MZMs). The topological quantum computing device may further include a qubit controller configured to connect a superconductor included in the qubit architecture to ground via a junction. The qubit controller may be further configured to perform one or more zero bias peak measurements at the qubit architecture. The qubit controller may be further configured to set a plurality of device parameters for the qubit architecture based at least in part on the one or more zero bias peak measurements. The qubit controller may be further configured to disconnect the superconductor from ground. The qubit controller may be further configured to calibrate the plurality of device parameters at least in part by determining whether the plurality of MZMs exhibit ground state degeneracy and modifying one or more device parameters of the plurality of device parameters when the plurality of MZMs are determined to not exhibit ground state degeneracy. The qubit controller may be further configured to modify one or more measurement device parameters of a measurement device coupled to the qubit architecture when the plurality of MZMs are determined to exhibit ground state degeneracy.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for use with a topological quantum computing device, the method comprising:
setting a plurality of device parameters for a qubit architecture including a plurality of semiconductor-superconductor junctions at which a respective plurality of Majorana zero modes (MZMs) are configured to be instantiated, wherein the plurality of device parameters are each selected from the group consisting of:
a plunger gate voltage;
a cutter gate voltage; and
an external magnetic field strength;
calibrating the plurality of device parameters at least in part by:
determining whether the plurality of semiconductor-superconductor junctions exhibit ground state degeneracy at least in part by measuring a charge or a conductance at the qubit architecture; and
modifying one or more device parameters of the plurality of device parameters in response to determining that the plurality of semiconductor-superconductor junctions do not exhibit ground state degeneracy; and
modifying one or more measurement device parameters of a measurement device coupled to the qubit architecture in response to determining that the plurality of semiconductor-superconductor junctions exhibit ground state degeneracy, wherein:
the one or more measurement device parameters include one or more quantum dot voltages; and
modifying the plurality of device parameters and the one or more measurement device parameters includes searching over respective ranges of the device parameters and the measurement device parameters.

2. The method of claim 1, wherein determining whether the plurality of semiconductor-superconductor junctions exhibit ground state degeneracy includes:
measuring the conductance between a first semiconductor-superconductor junction of the plurality of semiconductor-superconductor junctions and a second semiconductor-superconductor junction of the plurality of semiconductor-superconductor junctions while the first semiconductor-superconductor junction, the second semiconductor-superconductor junction, and at least a third semiconductor-superconductor junction of the plurality of semiconductor-superconductor junctions are connected to respective electrical leads; and
determining whether the plurality of semiconductor-superconductor junctions exhibit ground state degeneracy based on the conductance.

3. The method of claim 2, wherein modifying the one or more device parameters includes setting the plunger gate voltage of a plunger gate in a direction toward a topological-regime conductance value.

4. The method of claim 2, wherein determining whether the plurality of semiconductor-superconductor junctions exhibit ground state degeneracy further includes:
disconnecting the third semiconductor-superconductor junction from its respective electrical lead; and
measuring a change in the conductance while the third semiconductor-superconductor junction is disconnected.

5. The method of claim 2, further comprising:
computing a value of a cost function based at least in part on the conductance; and
modifying the plurality of device parameters based on the value of the cost function.

6. The method of claim 1, wherein the quantum dot voltages included among the one or more measurement device parameters are voltages of a plurality of quantum dots coupled to the semiconductor-superconductor junctions.

7. The method of claim 1, further comprising:
performing one or more zero bias peak measurements, correlated zero bias peak measurements, or non-local conductance measurements at the qubit architecture; and
setting the plurality of device parameters for the qubit architecture based at least in part on results of the one or more zero bias peak measurements, correlated zero bias peak measurements, or non-local conductance measurements.

8. The method of claim 1, wherein determining whether the plurality of semiconductor-superconductor junctions exhibit ground state degeneracy includes:
modifying the plunger gate voltage of at least one plunger gate included in the qubit architecture;
measuring a change in the charge on a superconductor included in the qubit architecture as the plunger gate voltage is modified; and
determining whether the plurality of semiconductor-superconductor junctions exhibit ground state degeneracy based on the change in the charge.

9. A topological quantum computing device comprising:
a qubit architecture including a plurality of semiconductor-superconductor junctions at which a respective plurality of Majorana zero modes (MZMs) are configured to be instantiated; and
a classical computing device configured to:
set a plurality of device parameters for the qubit architecture, wherein the plurality of device parameters are each selected from the group consisting of:
a plunger gate voltage;
a cutter gate voltage; and
an external magnetic field strength;
calibrate the plurality of device parameters at least in part by:
determining whether the plurality of semiconductor-superconductor junctions exhibit ground state degeneracy at least in part by measuring a charge or a conductance at the qubit architecture; and
modifying one or more device parameters of the plurality of device parameters in response to determining that the semiconductor-superconductor junctions do not exhibit ground state degeneracy; and
modify one or more measurement device parameters of a measurement device coupled to the qubit architecture in response to determining that the plurality of semiconductor-superconductor junctions exhibit ground state degeneracy, wherein:
the one or more measurement device parameters include one or more quantum dot voltages; and
modifying the plurality of device parameters and the one or more measurement device parameters includes searching over respective ranges of the device parameters and the measurement device parameters.

10. The topological quantum computing device of claim 9, wherein the classical computing device is configured to determine whether the plurality of semiconductor-superconductor junctions exhibit ground state degeneracy at least in part by:
measuring the conductance between a first semiconductor-superconductor junction of the plurality of semiconductor-superconductor junctions and a second semiconductor-superconductor junction of the plurality of semiconductor-superconductor junctions while the first semiconductor-superconductor junction, the second semiconductor-superconductor junction, and at least a third semiconductor-superconductor junction of the plurality of semiconductor-superconductor junctions are connected to respective electrical leads; and
determining whether the plurality of semiconductor-superconductor junctions exhibit ground state degeneracy based on the conductance.

11. The topological quantum computing device of claim 10, wherein modifying the one or more device parameters includes setting the plunger gate voltage of a plunger gate in a direction toward a topological-regime conductance value.

12. The topological quantum computing device of claim 10, wherein the classical computing device is further configured to determine whether the plurality of semiconductor-superconductor junctions exhibit ground state degeneracy at least in part by:
disconnecting the third semiconductor-superconductor junction from its respective electrical lead; and
measuring a change in the conductance while the third semiconductor-superconductor junction is disconnected.

13. The topological quantum computing device of claim 9, wherein the classical computing device is configured to determine whether the plurality of semiconductor-superconductor junctions exhibit ground state degeneracy at least in part by:
modifying the plunger gate voltage of one or more plunger gates;
measuring a change in the charge on a superconductor included in the qubit architecture as the plunger gate voltage is modified; and
determining whether the plurality of semiconductor-superconductor junctions exhibit ground state degeneracy based on the change in the charge.

14. The topological quantum computing device of claim 9, wherein the classical computing device is further configured to:

perform one or more zero bias peak measurements, correlated zero bias peak measurements, or non-local conductance measurements at the qubit architecture; and set the plurality of device parameters for the qubit architecture based at least in part on results of the one or more zero bias peak measurements, correlated zero bias peak measurements, or non-local conductance measurements.

15. The topological quantum computing device of claim 9, wherein:

the one or more quantum dot voltages included among the one or more measurement device parameters are voltages of a plurality of quantum dots coupled to the qubit architecture.

16. A topological quantum computing device comprising:

a qubit architecture including a plurality of semiconductor-superconductor junctions at which a respective plurality of Majorana zero modes (MZMs) are configured to be instantiated; and a classical computing device configured to:

connect a superconductor included in the qubit architecture to ground via a junction;

perform one or more zero bias peak measurements at the qubit architecture;

set a plurality of device parameters for the qubit architecture based at least in part on the one or more zero bias peak measurements, wherein the plurality of device parameters are each selected from the group consisting of:

a plunger gate voltage;

a cutter gate voltage; and an external magnetic field strength;

disconnect the superconductor from ground;

calibrate the plurality of device parameters at least in part by:

determining whether the plurality of semiconductor-superconductor junctions exhibit ground state degeneracy at least in part by measuring a charge or a conductance at the qubit architecture; and modifying one or more device parameters of the plurality of device parameters in response to determining that the plurality of semiconductor-superconductor junctions do not exhibit ground state degeneracy; and modify one or more measurement device parameters of a measurement device coupled to the qubit architecture in response to determining that the plurality of semiconductor-superconductor junctions exhibit ground state degeneracy, wherein:

the one or more measurement device parameters include one or more quantum dot voltages; and modifying the plurality of device parameters and the one or more measurement device parameters includes searching over respective ranges of the device parameters and the measurement device parameters.

\* \* \* \* \*